United States Patent
Sury et al.

(10) Patent No.: US 9,283,499 B2
(45) Date of Patent: Mar. 15, 2016

(54) FEEDWELL SYSTEM FOR A SEPARATION VESSEL

(75) Inventors: Ken N. Sury, Calgary (CA); Bharat Bhargava, Calgary (CA); Chadwick R. Larson, Vancouver (CA); Trevor L. Hilderman, Port Coquitlam (CA); Mohammad R. Shariati, Coquitlam (CA); Darwin Edward Kiel, New Westminster (CA)

(73) Assignee: ExxonMobil Upstream Research Company, Houston, TX (US)

( * ) Notice: Subject to any disclaimer, the term of this patent is extended or adjusted under 35 U.S.C. 154(b) by 234 days.

(21) Appl. No.: 14/002,626

(22) PCT Filed: Feb. 7, 2012

(86) PCT No.: PCT/US2012/024128
§ 371 (c)(1),
(2), (4) Date: Aug. 30, 2013

(87) PCT Pub. No.: WO2012/134634
PCT Pub. Date: Oct. 4, 2012

(65) Prior Publication Data
US 2014/0008293 A1    Jan. 9, 2014

(51) Int. Cl.
*B01D 21/24* (2006.01)
*B01D 21/00* (2006.01)

(52) U.S. Cl.
CPC ........ *B01D 21/2405* (2013.01); *B01D 21/0042* (2013.01); *B01D 21/0087* (2013.01);
(Continued)

(58) Field of Classification Search
CPC ........... B01D 21/0042; B01D 21/0087; B01D 21/2405; B01D 21/2411; B01D 21/2427; B01D 21/2494
USPC .......................................... 210/519, 539, 801
See application file for complete search history.

(56) References Cited

U.S. PATENT DOCUMENTS 2,528,094 A    10/1950    Walker
2,750,233 A *  6/1956    Yellott ............................ 406/67
(Continued)

FOREIGN PATENT DOCUMENTS

CA          2630691       3/1953
CA           940853       1/1974
(Continued)

OTHER PUBLICATIONS

Mastbergen, D.R.; et al., (2004) "Controlled submerged deposition of fine grained dredged sediment with various diffuser types", WODCON XVII, Sep. 27-Oct. 1, 2004, Hamburg, Germany.
(Continued)

*Primary Examiner* — Christopher Upton
(74) *Attorney, Agent, or Firm* — ExxonMobil Upstream Research-Law Department

(57) ABSTRACT

A feedwell system for delivering a slurry (for example a bituminous slurry) to a separation vessel (for example a primary separation vessel) includes a feedwell barrel with an inlet for receiving the slurry, internal baffles, and a bottom outlet. A downpipe extends from the bottom of the barrel directing the existing slurry onto a deflector plate deflecting the slurry radially and outwardly. A protector plate located between the downpipe and the deflector plate improves the underwash layer stability. Ventilation openings in the protector plate induce inflow which reduces the discharge velocity, limits the formation of an adverse pressure gradient and encourages circumferential distribution.

20 Claims, 6 Drawing Sheets

(52) U.S. Cl.
CPC ........ *B01D21/2411* (2013.01); *B01D 21/2427* (2013.01); *B01D 21/2494* (2013.01); *B01D 2221/04* (2013.01)

(56) References Cited

U.S. PATENT DOCUMENTS

| | | | |
|---|---|---|---|
| 2,793,186 A * | 5/1957 | Anderson Dunell Basil et al. ................ 210/532.1 | |
| 4,082,671 A | 4/1978 | Kelly | |
| 4,676,889 A | 6/1987 | Hsieh et al. | |
| 5,015,392 A | 5/1991 | Taylor | |
| 5,147,556 A | 9/1992 | Taylor | |
| 5,236,577 A | 8/1993 | Tipman et al. | |
| 5,274,572 A | 12/1993 | O'Neill et al. | |
| 5,597,483 A * | 1/1997 | Schaller ................ 210/539 | |
| 5,781,430 A | 7/1998 | Tsai | |
| 5,876,592 A | 3/1999 | Tipman et al. | |
| 5,913,022 A | 6/1999 | Tinaztepe et al. | |
| 5,920,718 A | 7/1999 | Uczekaj et al. | |
| 5,944,995 A | 8/1999 | Sethi et al. | |
| 5,968,349 A | 10/1999 | Duyvesteyn et al. | |
| 6,007,709 A | 12/1999 | Duyvesteyn et al. | |
| 6,028,819 A | 2/2000 | Mullarkey et al. | |
| 6,074,558 A | 6/2000 | Duyvesteyn et al. | |
| 6,126,817 A * | 10/2000 | Duran et al. ................ 210/539 | |
| 6,182,014 B1 | 1/2001 | Kenyon et al. | |
| 6,191,787 B1 | 2/2001 | Lu et al. | |
| 6,195,092 B1 | 2/2001 | Dhond et al. | |
| 6,214,213 B1 | 4/2001 | Tipman et al. | |
| 6,323,679 B1 | 11/2001 | Robertson et al. | |
| 6,358,403 B1 | 3/2002 | Brown et al. | |
| 6,358,404 B1 | 3/2002 | Brown et al. | |
| 6,374,252 B1 | 4/2002 | Althoff et al. | |
| 6,401,081 B1 | 6/2002 | Montgomery et al. | |
| 6,411,922 B1 | 6/2002 | Clark et al. | |
| 6,498,988 B1 | 12/2002 | Robert et al. | |
| 6,678,642 B1 | 1/2004 | Budge | |
| 6,712,215 B2 | 3/2004 | Scheybeler | |
| 6,731,994 B2 | 5/2004 | Heching et al. | |
| 6,731,998 B2 | 5/2004 | Walser et al. | |
| 6,800,116 B2 | 10/2004 | Stevens et al. | |
| 6,829,570 B1 | 12/2004 | Thambynayagam et al. | |
| 6,910,001 B2 | 6/2005 | Hammersley et al. | |
| 6,934,931 B2 | 8/2005 | Plumer et al. | |
| 6,966,985 B2 | 11/2005 | Schoenbrunn et al. | |
| 6,980,935 B2 | 12/2005 | Lu et al. | |
| 6,980,940 B1 | 12/2005 | Gurpinar et al. | |
| 6,996,803 B2 | 2/2006 | Sakamoto et al. | |
| 7,067,811 B2 | 6/2006 | Long et al. | |
| 7,141,162 B2 | 11/2006 | Garner et al. | |
| 7,296,274 B2 | 11/2007 | Cohen et al. | |
| 7,376,472 B2 | 5/2008 | Wojsznis et al. | |
| 7,451,066 B2 | 11/2008 | Edwards et al. | |
| 7,478,024 B2 | 1/2009 | Gurpinar et al. | |
| 7,499,841 B2 | 3/2009 | Hoffman | |
| 7,516,446 B2 | 4/2009 | Choi et al. | |
| 7,546,578 B2 | 6/2009 | Yang | |
| 8,550,258 B2 * | 10/2013 | Bara et al. ................ 210/519 | |
| 9,004,294 B2 * | 4/2015 | Bara et al. ................ 210/519 | |
| 2003/0018490 A1 | 1/2003 | Magers et al. | |
| 2003/0125818 A1 | 7/2003 | Johnson | |
| 2003/0139907 A1 | 7/2003 | McCarthy | |
| 2004/0054564 A1 | 3/2004 | Fonseca et al. | |
| 2004/0111428 A1 | 6/2004 | Rajan et al. | |
| 2005/0027559 A1 | 2/2005 | Rajan et al. | |
| 2005/0150844 A1 | 7/2005 | Hyndman et al. | |
| 2005/0263437 A1 | 12/2005 | Howdeshell | |
| 2006/0111903 A1 | 5/2006 | Kemmochi et al. | |
| 2006/0113218 A1 | 6/2006 | Hart et al. | |
| 2006/0138036 A1 | 6/2006 | Garner et al. | |
| 2006/0138055 A1 | 6/2006 | Garner et al. | |
| 2006/0196812 A1 | 9/2006 | Beetge et al. | |
| 2006/0249439 A1 | 11/2006 | Garner et al. | |
| 2006/0260980 A1 | 11/2006 | Yeung | |
| 2006/0282243 A1 | 12/2006 | Childs et al. | |
| 2007/0156377 A1 | 7/2007 | Gurpinar et al. | |
| 2007/0168057 A1 | 7/2007 | Blevins et al. | |
| 2007/0168741 A1 | 7/2007 | Chadha et al. | |
| 2007/0228194 A1 * | 10/2007 | Takeno et al. ................ 241/24.24 | |
| 2008/0208552 A1 | 8/2008 | Kumar et al. | |
| 2008/0288226 A1 | 11/2008 | Gurpinar et al. | |
| 2010/0187191 A1 * | 7/2010 | Triglavcanin ................ 210/519 | |
| 2011/0062090 A1 | 3/2011 | Bara et al. | |
| 2011/0079563 A1 * | 4/2011 | Triglavcanin et al. ........ 210/519 | |

FOREIGN PATENT DOCUMENTS

| | | |
|---|---|---|
| CA | 2075108 | 1/1994 |
| CA | 2200899 | 9/1998 |
| CA | 2232929 | 9/1998 |
| CA | 2318895 | 7/1999 |
| CA | 2353109 | 1/2003 |
| CA | 2449443 | 1/2003 |
| CA | 2449657 | 1/2003 |
| CA | 2502943 | 5/2004 |
| CA | 2505411 | 7/2004 |
| CA | 2425840 | 10/2004 |
| CA | 2435113 | 1/2005 |
| CA | 2493677 | 6/2005 |
| CA | 2455011 | 7/2005 |
| CA | 2490734 | 6/2006 |
| CA | 2502329 | 9/2006 |
| CA | 2521248 | 3/2007 |
| CA | 2665780 | 5/2008 |
| CA | 2678307 | 8/2008 |
| WO | WO 99/33936 | 7/1999 |

OTHER PUBLICATIONS

Tyler, J. et al., (2009) "The Use of Physical Modeling in the Optimisation of a Primary Separation Vessel Feedwell", Canadian Journal of Chemical Engineering, 87:821-831.

* cited by examiner

FEEDWELL SYSTEM FOR A SEPARATION VESSEL

CROSS-REFERENCE TO RELATED APPLICATIONS

This application is the National Stage of International Application No. PCT/US2012/024128, filed Feb. 7, 2012, which claims priority to Canadian Patent Application 2,734,811 filed on Mar. 29, 2011 entitled FEEDWELL SYSTEM FOR A SEPARATION VESSEL, the entirety of which is incorporated by reference herein.

FIELD

The present disclosure is in the field of separation vessels. More particularly, the present disclosure relates to feed delivery in separation vessels.

BACKGROUND

Separation vessels are used in various fields, for instance to separate solid particles from liquid particles in a slurry. One such field is bitumen extraction from mined oil sands.

Processes for extracting bitumen from mined oil sands commonly employ the steps of bitumen extraction, bitumen froth separation, and froth treatment. An example of such a process will now be provided, although different processes exist.

Oil sand is supplied from a mine, mixed with water, and separated from rocks and debris. The slurry is conditioned by adding air, and optionally chemical additives such as caustic (sodium hydroxide). Conditioning serves to liberate the bitumen from the oil sand and aerate the bitumen to produce buoyant bitumen droplets. The slurry is sent to a primary separation cell/vessel (PSV) where the aerated bitumen droplets separate from most of the solids to form bitumen froth. PSV's are typically large conical gravity separation vessels designed to provide a sufficient residence time in a low mixing energy environment to allow buoyancy forces to separate the bitumen froth and sand from the slurry. The slurry is supplied to the PSV through a feed pipe at sufficient velocity to limit solids deposition and this flow enters a central feedwell where it is distributed radially into the vessel. Lighter bitumen droplets rise through the froth underwash layer and accumulate in the froth layer at the top of the vessel where it overflows a weir and is sent for further processing. A supplementary hot water underwash flow is supplied under the bitumen froth layer to assist with removal of fine solid particles and to increase froth temperature. The fine, near neutral buoyancy particles tend to be suspended in the middlings zone of the vessel and are either drawn with the middlings stream to flotation or pumped away in an underflow stream.

The bitumen froth product stream from the PSV comprises bitumen, water and fine solids (also referred to as mineral solids). A typical composition of bitumen froth is about 60 wt % bitumen, 30 wt % water, and 10 wt % solids. This froth is then treated to separate out diluted bitumen. The tailings stream from the PSV comprises coarse solids, some fine solids, and water.

Thus, PSVs typically employed in water-based oil sand separation systems are used to separate bitumen and solids in a three-phase separation process. Preferably, the PSV should provide high recovery of bitumen froth, clean bitumen froth (with low solids concentration), low wear leading to low maintenance, and good performance over the range of expected operating conditions. To meet these performance goals, the central feedwell should take the varying incoming feed stream and distribute it evenly in all azimuthal directions and minimize mixing motions that would disturb the underwash water layer.

One known PSV feedwell is the Syncrude Aurora feedwell design described in Tyler, J., Spence, J. Kiel, D., Schaan, J. Larson, G. (2009) "The Use of Physical Modeling in the Optimization of a Primary Separation Vessel Feedwell", The Canadian Journal of Chemical Engineering, and shown in FIGS. 1A and 1B herein. With reference to FIGS. 151A and 1B, a feed inlet (101) enters tangentially into an open barrel (102) which allows excess air to escape. The flow swirls through the barrel with eight radial baffles (103a, 103b, 103c, 103d, 103e, 103f, 103g, and 103h) of increasing size in the direction of the swirl. The flow discharges from an orifice at the bottom of the barrel (104), and through a short downpipe (105) onto a conical deflector plate (106).

SUMMARY

It would be desirable to have a feedwell system providing improved separation performance, reduced sensitivity to throughput, improved wear resistance, and/or increased underwash layer stability.

Generally, the present invention provides, in one aspect, a feedwell system for delivering a slurry (for example a bituminous slurry) to a separation vessel (for example a primary separation vessel). The system includes a feedwell barrel with an inlet for receiving the slurry, internal baffles, and a bottom outlet. A downpipe extends from the bottom of the barrel directing the existing slurry onto a deflector plate deflecting the slurry radially and outwardly. A protector plate located between the downpipe and the deflector plate improves the underwash layer stability. Ventilation openings in the protector plate induce inflow which reduces the discharge velocity, limits the formation of an adverse pressure gradient and encourages circumferential distribution.

In one aspect, there is provided a feedwell system for delivering a slurry to a separation vessel, the system comprising: a feedwell barrel for containing and controlling the slurry, the feedwell barrel having an inlet for receiving the slurry; a series of spaced-apart internal baffles disposed around an inner perimeter of the feedwell barrel for dissipating inflow energy while limiting an internal circulation field within the feedwell barrel; the feedwell barrel having a bottom with an outlet therein to allow discharge of the slurry, the outlet being sized to cause a buildup of slurry within the feedwell barrel, to dissipate energy; an extension downpipe depending down from the bottom of the barrel below the outlet for encouraging axi-symmetric discharge of the slurry out of the extension downpipe; a deflector plate located below, and spaced from, the extension downpipe to deflect the slurry radially and outwardly; and a protector plate located above the deflector plate and below the extension downpipe for limiting discharge flow off the deflector plate from disrupting layers formed in the separation vessel, for encouraging circumferential distribution, and for limiting recirculation of the slurry into an area between the extension downpipe and the deflector plate, the protector plate comprising at least one ventilation opening for limiting formation of an adverse pressure gradient.

BRIEF DESCRIPTION OF THE DRAWINGS

Embodiments of the present invention will now be described, by way of example only, with reference to the attached Figures, wherein.

DETAILED DESCRIPTION

As used herein, "substantially" means within 10° in the context of an angle and 10% otherwise.

While much of the discussion herein relates to the field of bitumen extraction, the feed delivery system disclosed herein may be used in other fields. For instance, the system may be used in gravity separation vessels which separate heavy and light particles from a continuous liquid phase.

Generally, it is desirable to uniformly distribute the slurry radially in a PSV to optimize the use of the volume and cross-sectional area of the vessel while dissipating the incoming energy of the feed and maintaining the underwash layer and limiting erosion by the incoming feed stream. It is also desirable to accommodate a range of feed flow rates and compositions while maintaining bitumen froth recovery and quality targets with minimal wear. Improving the feed delivery may also have a positive influence on the froth underwash and middlings withdrawal.

The experimental section below shows how the feedwell system of embodiments of the instant invention provides benefits over a conventional design.

Figure 2A:
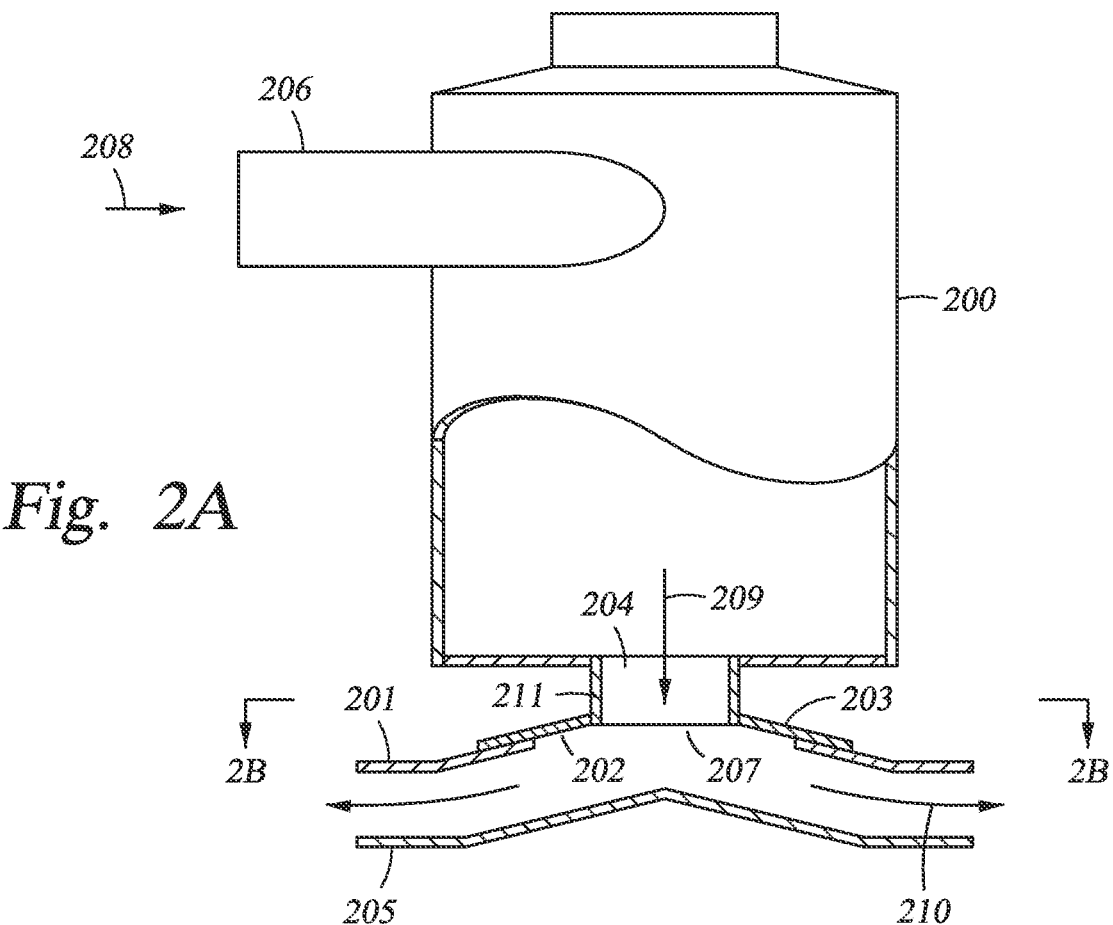
FIG. 2A is a schematic of a side view of a feedwell in accordance with an embodiment described herein.
Figure 2B:
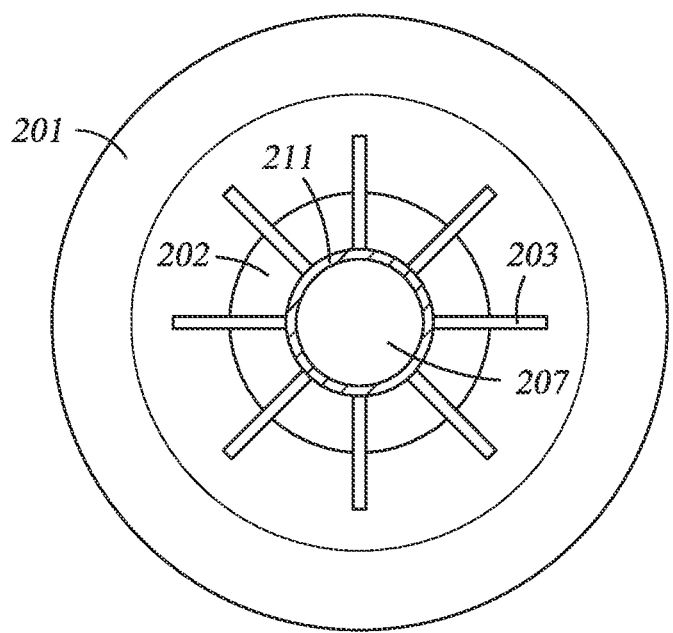
FIG. 2B is a schematic of a top view of a protector plate in accordance with an embodiment described herein.
Figure 3A:
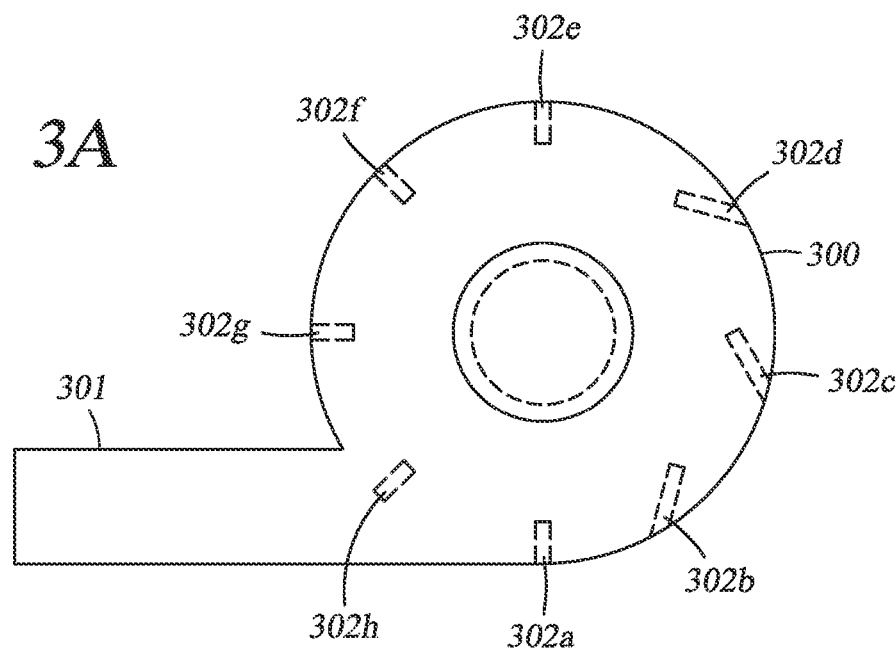
FIG. 3A is a schematic of a top view of a feedwell in accordance with an embodiment described herein.
Figure 3B:
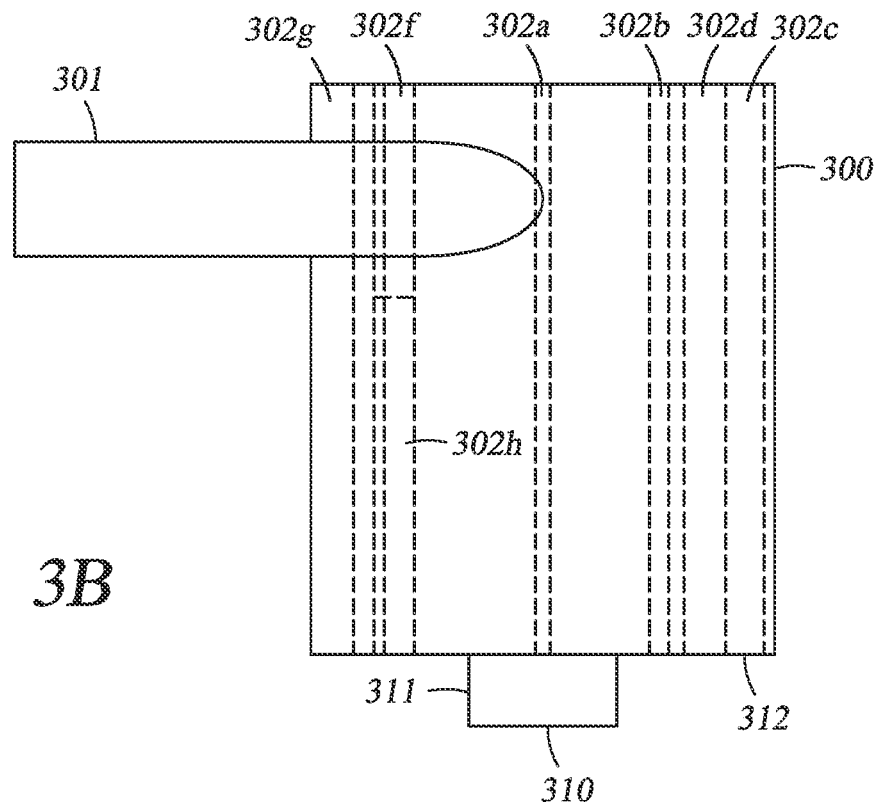
FIG. 3B is a schematic of side view of a feedwell in accordance with an embodiment described herein.

FIGS. 2A and 2B illustrate a feedwell system with a ventilated top plate design. FIGS. 3A and 3B illustrate a feedwell baffle design.

Described herein is a system for uniformly and radially delivering feed to the PSV for efficient separation of aerated bitumen from the solid particles, with the preservation of the froth underwash layer in the vessel. The system may include the following:

1. A barrel with an open top to contain and control the inflowing slurry from the tangential inlet.

2. A series of internal baffles around the inner perimeter of the feedwell barrel to dissipate the inflow energy in a controlled fashion without generating a strong internal circulation field within the barrel.

3. A bottom plate with a central outlet causing a controlled buildup of slurry within the barrel to assist in dissipating energy.

4. A short extension downpipe below the hole to help encourage axi-symmetric discharge through the downpipe.

5. A deflector plate located some distance below the downpipe to deflect the downward slurry stream horizontally over 360 degrees.

6. A protector plate located above the deflector plate including ventilation near the downpipe to limit or prevent the discharge flow off the deflector plate from disrupting the bitumen froth and underwash layers and for encouraging circumferential distribution. The vented plate also limits or eliminates the entrainment of fluid from above the feedwell discharge. Ventilation openings in the protector plate help to decelerate the inflow, reduce the adverse pressure gradient, and maintain circumferentially uniform discharge.

When central feedwells employing bottom deflector plates are used for feed distribution, it can be difficult to avoid the erosion of the underwash layer due to the effects of turbulence and large scale circulation created by the discharge of the deflector plate. Referring to FIG. 2, the feedwell barrel (200) and inlet pipe (206) are shown. A protector plate (201), positioned above the deflector plate (205), is designed to protect the underwash layer from erosion while also preserving uniform circumferential distribution. The protector plate comprises an opening (207), which may be centrally located, to allow the slurry exiting the barrel (200) to pass. There is a series of ventilation openings (202) in the protector plate (201) adjacent to the opening (204) in the bottom of the feedwell barrel. The ventilation openings (202) limit the formation of an adverse pressure gradient by providing pressure communication, reducing the risk of local separation and circumferential maldistribution. The open area and position of the ventilation openings in the protector plate, and the slope of the protector plate, are selected to provide flow deceleration with symmetric separation. If used, the ventilation openings must be appropriately sized to limit excessive liquid inflow which can lead to entrainment of bitumen rich slurry and the underwash layer. The flow of the slurry is shown at three stages: entering the feedwell system (208), exiting the feedwell barrel (209), and passing between the deflector and protector plates (210). An extension downpipe (211) is also shown and is discussed below.

Referring to FIGS. 3A and 3B, flow enters the feedwell (300) through the inlet pipe (301), and the kinetic energy of the in-flow stream is reduced by a series of vertical baffles (302a, 302b, 302c, 302d, 302e, 302f, 302g, and 302h) located around the inner circumference of the feedwell barrel, and by the slurry pool contained within the feedwell. The width of the baffles (radial dimension) increases around the circumference of the feedwell in the direction of circulation with the smallest baffle positioned to directly intercept the tangential inflow stream. The angle, height and position of the baffles are tuned for best performance as detailed below. This baffle arrangement is an improvement for three reasons. First, this design distributes the dissipation of energy spatially resulting in more uniform wear of the baffles. Second, it limits short circuiting of feed from the feedwell inlet to the feedwell discharge along the first, or first several baffles. Third, it improves performance over a range of inlet flow rates, which change both the fill depth and the trajectory of the inflowing stream. Reducing the fluid momentum in the barrel and limiting the formation of strong circulation currents, improves the probability of obtaining axi-symmetric flow out the orifice or outlet (310) in the bottom plate (or bottom) (312) of the barrel (300). The outlet (310) may be centrally located in the bottom (312) of the barrel (300). The flow restriction provided by the outlet (310) causes the feed slurry to partially fill the barrel, which increases the feed energy dissipation. The presence of the extension downpipe (311) on the barrel outlet also improves the symmetry of the outlet flow. Having a highly symmetric discharge is important because if the discharge does not strike the center of the deflector plate (205) as shown in FIG. 2, then a non-uniform circumferential discharge will result.

In the discussions below, unless stated otherwise, comparisons are made to the Syncrude Aurora feedwell design described in the background section.

Baffle Design

The position, height and angle of the baffles (302a-302h), as shown in FIGS. 3A and 3B, can reduce wear and improve the axi-symmetric discharge from the feedwell. Specifically, refinement of the baffles included computational fluid dynamics (CFD) optimization of baffle wear and feed distribution along with verification with cold-flow physical models in a visualization tank. The following features are highlighted in FIG. 3A:

(a) The height of the baffle (302h) (directly under the inlet) was reduced to avoid impingement of the in-flow at all conditions, particularly the turn-down conditions which would have resulted in direct impact and high baffle wear without this change;

(b) For all other baffles (302a-302g), the height was increased to always exceed the depth of the fluid pool (or the full height of the feedwell);

(c) The angular orientation of baffles (302b) and (302c) was changed to be 30° relative to the feedwell wall, and the angular orientation of baffle (302d) was changed to 45° relative to feedwell wall.

This refined baffle design was also found to slightly improve the circumferential distribution of the feed. By measuring the velocity profile at 8 points around the circumference of the feedwell, the variability of the feed velocity (and corresponding mass flux) was found to improve from 12.1% (standard deviation/mean) with the feedwell of FIG. 1 to 10.3% (standard deviation/mean) with the feedwell of FIG. 3A.

Vented Protector Plate

The vented protector top plate (201) in FIG. 2B with vents (202) and structural supports (203) to support the protector plate and to maintain the correct vent opening size protects the underwash layer from entrainment by the feed flow. For the case of PSVs used in oil sands applications, it is often desirable to maintain a stable layer of aerated bitumen froth combined with a stable layer of warm underwash water beneath the froth layer in order to reduce the carry-over of mineral fines.

When central feedwells employing bottom deflector plates are utilized for feed distribution, it can be difficult to avoid the erosion of the underwash layer due to the effects of turbulence and large scale circulation created by the discharge off the deflector plate. An unvented protective plate was found to have uneven circumferential feed distribution.

The protector plate (201), positioned above the deflector plate (205), is designed to allow entrainment of external fluid to assist in decelerating the inflowing stream and to protect the underwash layer from erosion, while also preserving circumferential distribution. This protector plate (201) is conical and is of approximately the same diameter as the deflector plate and is located above the deflector plate (205) approximately level with the bottom of the outlet (204) in the bottom of the feedwell barrel (200). The protector plate (201) has a downward slope of approximately 20 degrees and finishes with a horizontal portion to match the bottom deflector plate (205). The ventilation opening or series of openings (202) is/are adjacent to the downpipe (204) from the bottom of the feedwell. The ventilation openings (202) allow for the controlled inflow of external fluid to assist in decelerating the inflow velocity, and reducing the adverse pressure gradient by providing pressure communication, thereby reducing the risk of locally separated flow and circumferential maldistribution. The area and position of the ventilation openings in the protection plate, and the slope of the protection plate, are selected to provide flow deceleration with symmetric separation. If used, the openings must be appropriately sized to limit excessive liquid inflow which can lead to entrainment of bitumen rich slurry or the underwash layer, but to allow pressure communication between the top and bottom surface of the protector plate. This design with a series of vents was tested and found to improve the circumferential distribution to 15.6% (standard deviation/mean). An embodiment included support bars (203), FIG. 2B, between the top plate and feedwell downpipe.

Figure 1A:
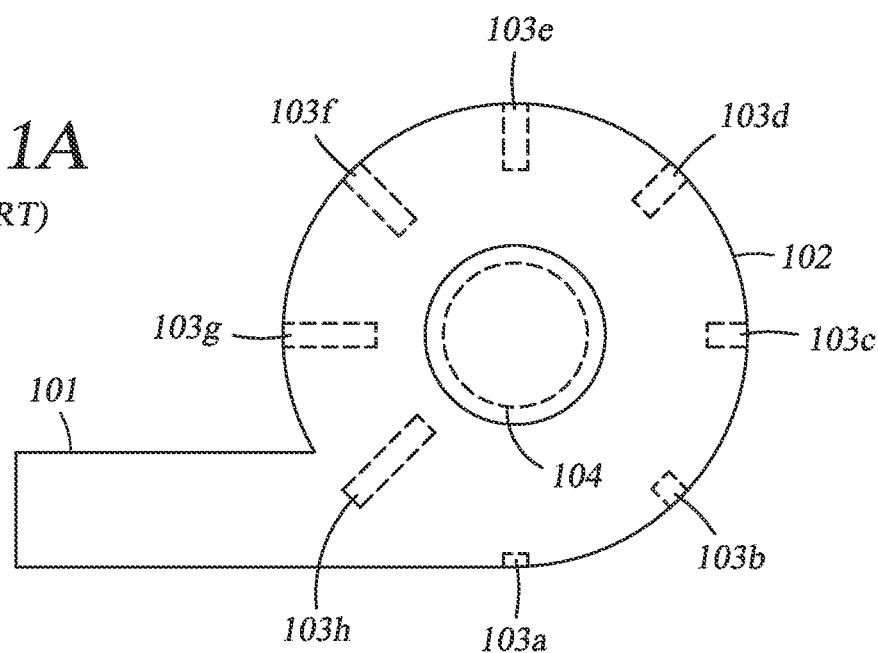
FIG. 1A is schematic of a top view of a prior art feedwell.
Figure 1B:
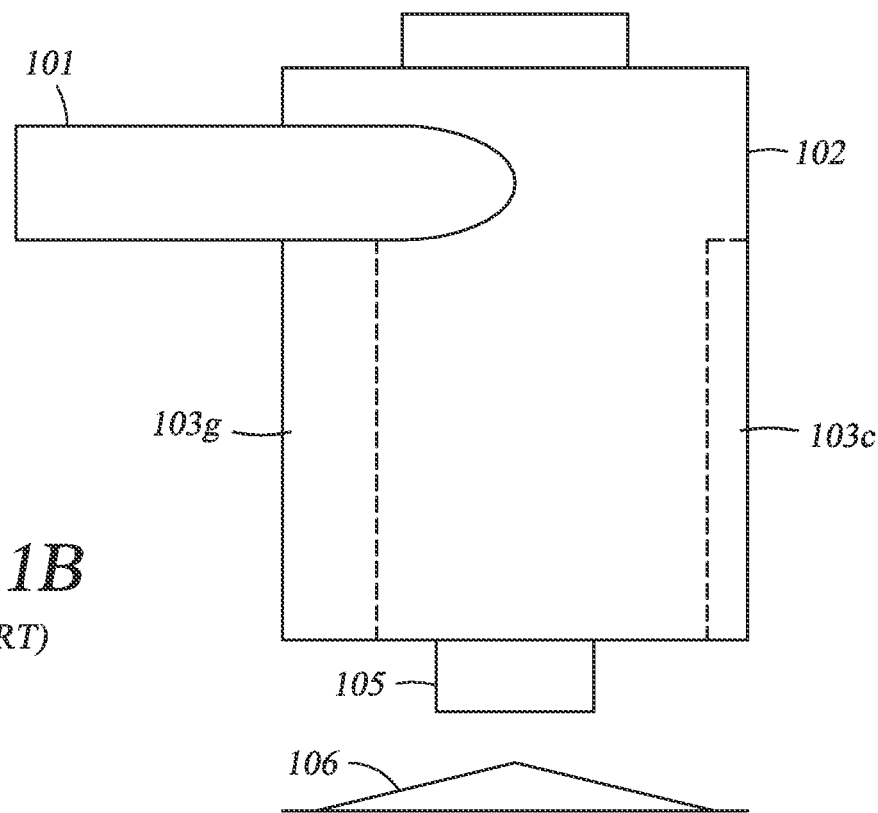
FIG. 1B is schematic of a side view of the prior art feedwell of FIG. 1A.
Figure 4:
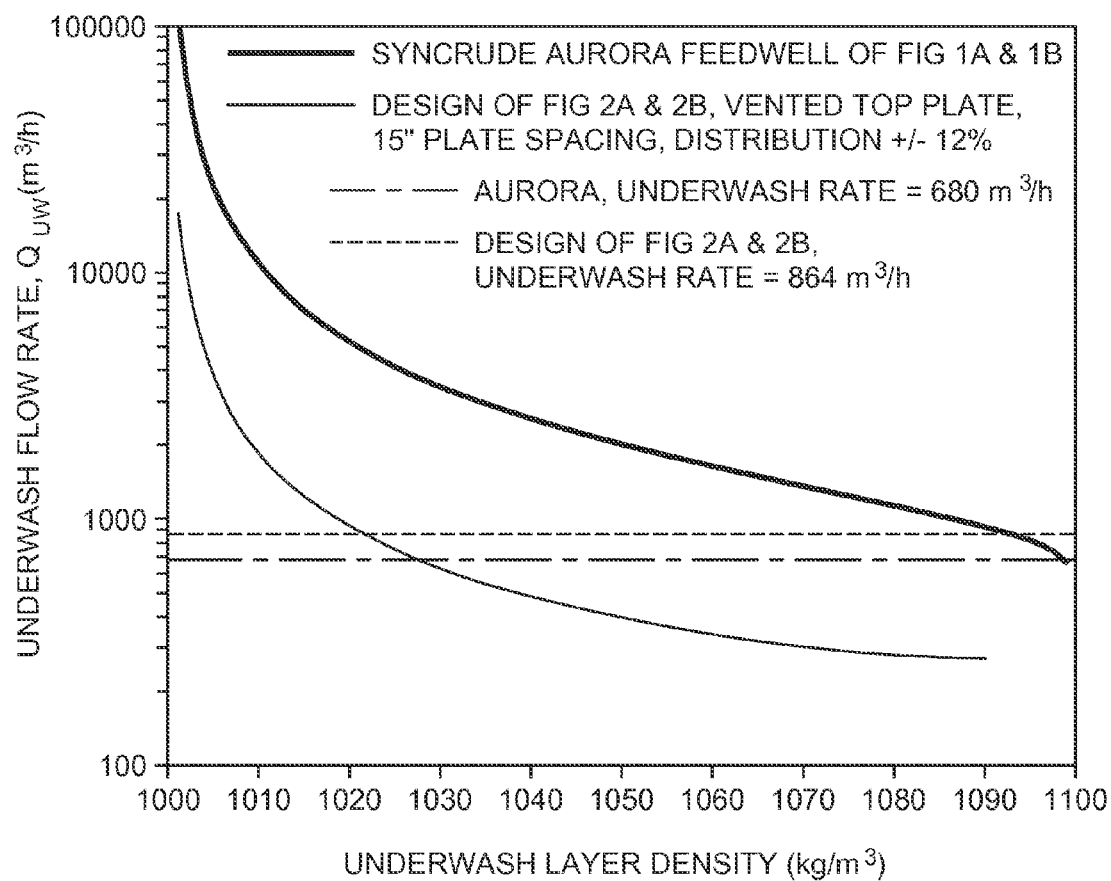
FIG. 4 is a graph illustrating underwash flow rate as a function of underwash layer density.
Figure 5A:
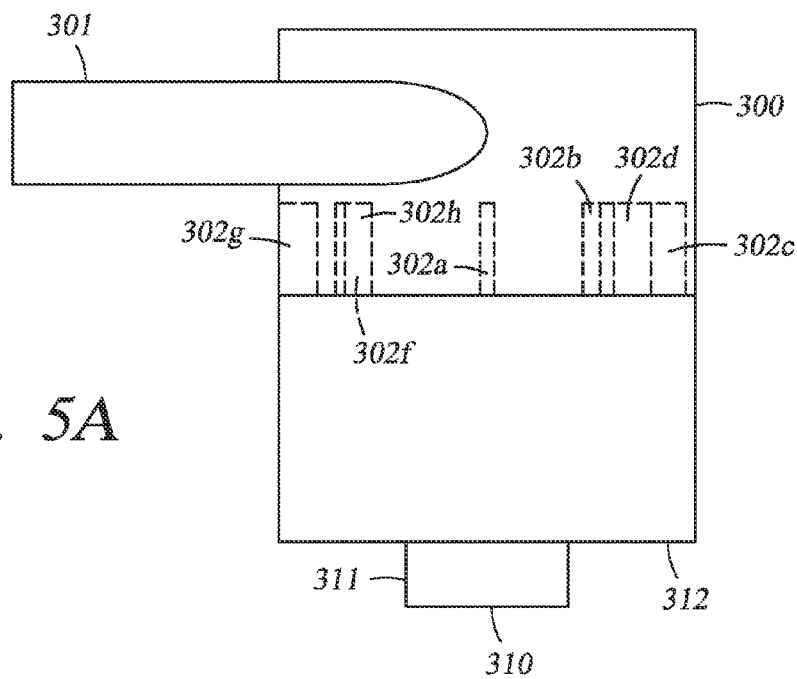
FIG. 5A is schematic of a baffle configuration described herein with baseline baffle heights.
Figure 5B:
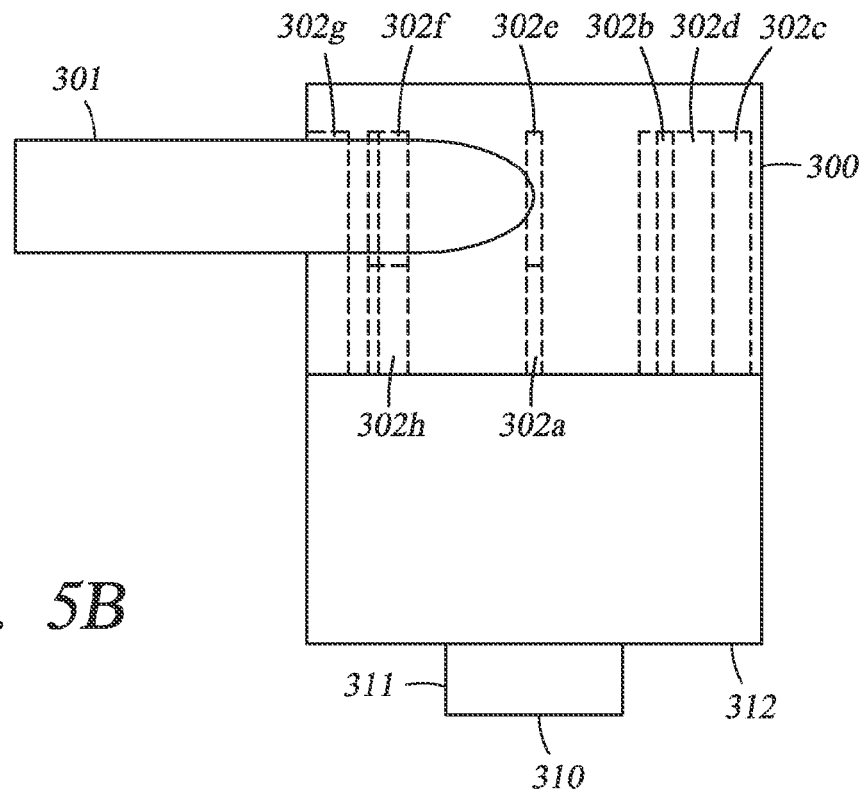
FIG. 5B is a schematic of a baffle configuration described herein with increased baffle heights for seven of the eight baffles.
Figure 6:
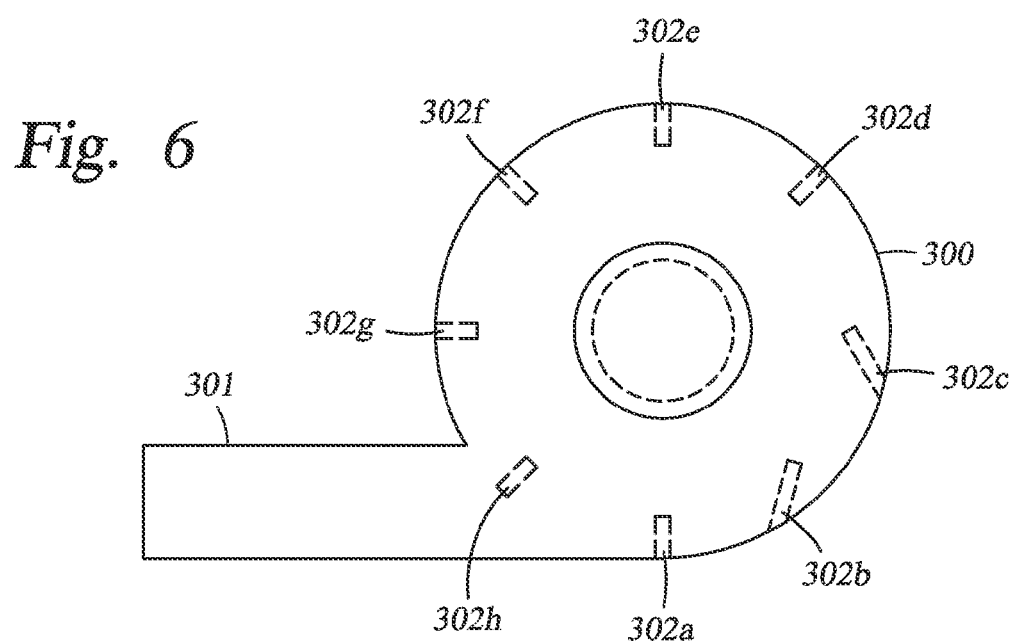
FIG. 6 is schematic of a baffle configuration described herein.

Cold-flow modeling of the feedwell system with optimized baffles configurations and the vented top plate was found to have underwash stability that was far superior to the feedwell design without a protector plate depicted in FIG. 1B, as graphically shown in FIG. 4. Based on laboratory experiments the feedwell of FIG. 1A/1B is unable to maintain a stable underwash layer under any commercial operating conditions while the instant design is predicted to maintain a stable underwash layer with only about a 20% dilution with middlings liquid. Cold-flow modeling indicated that the instant feedwell design exhibited a separation performance that was slightly higher than a feedwell without a vented protector plate, although the difference was not statistically significant.

EXPERIMENTAL

Baffles

The Syncrude Aurora feedwell discussed in the background section was designed for use with a particular, substantially constant, volumetric flow rate. However, for the present inventors, it was desirable to develop a feedwell capable of operating at a higher flow rate (for instance at about 10,000 tph of ore) and also at a lower flow rate (for instance at about 4,000 tph of ore). It is not conventional to operate at such variable flow rates. Being able to accommodate such variable flow rates may be useful, for instance, where the separation efficiency changes due to, for instance, the input of grades of varying quality and seasonal variations. The potential risk of increased wear was identified for both higher and lower rates. The potential for increased wear at high rates is related to the fact that wear increases with fluid velocity and mass flux of abrasive particles, and the potential risk of increased wear at lower flow rates is related to the reduced fill level in the barrel and the steeper trajectory of the inflowing stream.

Potentially, a baffle design that is only optimized for high rates could have adverse effects and cause increased wear at low flow rates because of the large difference in the internal barrel flow patterns. Under some low flow rate conditions, the inlet jet plunges downward and impacts the baffle directly under the inlet, which redirects the flow downward and would likely lead to excessive wear of that baffle.

The primary tool used for this portion of the experiments was computational fluid dynamics simulation (CFD). The final feedwell design was then validated in the visualization tank with a physical model.

Baseline CFD

Many parameters were extracted from the CFD results including velocity maps, predicted erosion maps, and particle trajectories. A quantitative measure of the discharge distribution was also calculated by determining the mass flow through eight sectors of a cylinder parallel to the feedwell barrel, and dividing the standard deviation into the mean mass flow through each sector (σ/mean).

The Syncrude Aurora design of FIG. 1 was used as the baseline. Each baffle has a short "foot" at the bottom extending out to the maximum baffle width. For the baseline CFD runs, a number of parameters were examined to characterize the flow field inside the barrel, and to determine the areas most likely to suffer from high wear. The baffle numbering system is as follows: Baffle #1 is the first baffle beyond the inlet pipe end (103a). The numbering continues in the direction of the inlet flow, that is #2 (103b), #3 (103c), #4 (103d), #5 (103e), #6 (103f), #7 (103g), and #8 (103h).

High rate (10,000 tph):
  High flow rate CFD visualizations performed with the Syncrude Aurora design showed a strong downward vector in the region between baffles #2 and #3, and increased wear along these baffles. This internal maldistribution likely contributed to asymmetry observed at the outlet at this high flow rate. More minor asymmetry was also observed on the deflector plate.
  High wear was also predicted on the side of the barrel opposite the feed inlet between baffles #3 and #4 and at the feet of baffles #2 and #3.
  CFD Circumferential mass distribution (σ/mean) around the deflector plate was determined to be ±4.5% for the high flow rate.

Low rate (4,000 tph):
  The low flow rate CFD visualizations showed that downward flow was dominant between baffles #1 and #3, and that a strong recirculation pattern occurred between baffles #1 and #2. Lower-velocity recirculation zones were noted elsewhere in the feedwell.
  The inlet flow was observed to impinge directly on to baffle #8 in both the CFD simulations and laboratory flow visualizations. These finding indicate that baffle #8 is susceptible to high wear when operating at the lower flow rate limit.
  CFD Circumferential mass distribution (σ/mean) around the deflector plate was determined to be ±7.0% for the low flow rate.

On the basis of these findings it was concluded that baffle #8 would likely need to be modified to avoid high wear at low flow rates, and that the orientation of baffle #2 and #3 would also need to be modified to reduce the strong internal circulation and associated wear at the highest flow rates. The predicted wear on the deflector plate was relatively even, indicating that the mass distribution was likely adequate for the application.

Baffle Optimization Designs

The baffle numbering system used in FIGS. 5A, 5B, 6, 7, and 8 is the same as that of FIGS. 1A, 3A, and 3B, that is, baffle #1 (302a), baffle #2 (302b), baffle #3 (302c), baffle #4 (302d), baffle #5 (302e), baffle #6 (302f), baffle #7 (302g), and baffle #8 (302h).

A number of potential baffle modifications were developed to address the primary flow distribution problems observed at the high and low flow rates tested in the visualization tank and CFD simulations. These modifications are listed in Table 1 and shown in FIGS. 5A, 5B and 6 to 8.

TABLE 1

CFD Baffle Wear Optimization Test Matrix 1. 7 baffles extended up, evenly distributed, baffle #8 removed (FIG. 5A)
2. 8 baffles, baffle #8 shortened, all other baffles extended up (FIG. 5B)
3. angled baffles #2, #3 (FIG. 6)
4. 'feet' removed (FIG. 7)
5. final optimization: (FIG. 8) combined options 2, 3, 4 above Initial Optimization Results Experiments performed in the flow visualization tank showed that extending all the baffles upward above the feed inlet to the proposed fill depth mitigated the standing wave present at intermediate flow rates. It was then found that at the highest flow rate the standing waves exceeded the height of these baffle extensions and therefore all further optimization were performed with the baffles extended to the full height of the feedwell barrel.

Figure 7:
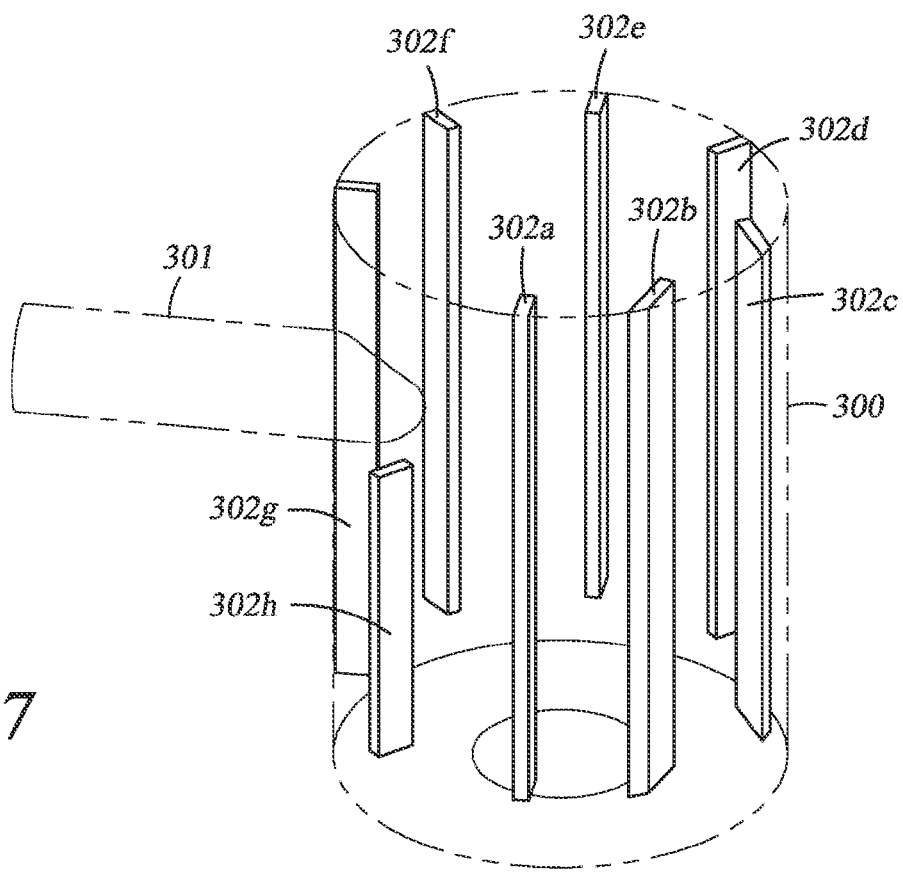
FIG. 7 is a schematic of a baffle configuration described herein.

The circumferential mass flow distribution results from the CFD simulations are summarized in Table 2. The standard deviation of the mass flow rate within each of the eight feedwell output sectors is normalized in each case by the mean mass flux. Removing baffle #8 completely was found to increase distribution asymmetry, and subsequent optimizations utilized a shortened baffle #8. Extending the baffles up to the top of the feedwell, while mitigating the standing wave at intermediate rates, was found to have less desirable distribution than the base case at the high rate. Baffles #2 and #3 redirected much of the feed jet along the length of the baffle, rather than allowing swirl to build up in the feedwell and distribute the jet impact along the tops of the baffles. Rather than shortening the baffles, which could result in adverse wear patterns, the optimization involved changing the angles of baffles #2 and #3. This modification, shown in FIG. 6, was found to reduce the high discharge velocities associated with high wear and while also improving the feed distribution beyond the baseline (σ/mean) of 4.5%. Seeking further improvement to the circumferential uniformity, an additional simulation was performed with the bottom 0.5 m of the baffles removed, as shown in FIG. 7. This change was found to provide a further improvement to the circumferential distribution. Although completely removing the bottom of the baffles was not feasible for mechanical design reasons, the 'feet' (the inward extension) at the bottom of the baffles were removed in subsequent optimizations.

TABLE 2

Mass flux circumferential distribution results for the various designs tested at highest and lowest flow rates

| Feedwell Description | Mass Distribution* for high rate (σ/mean) | Mass Distribution for low rate (σ/mean) |
| --- | --- | --- |
| Baseline Aurora design | 4.5% | 7.0% |
| 7 baffles extended up, evenly distributed (baffle #8 removed) | 9.3% | n/a |
| Optimization - 8 baffles, baffle #8 shortened, 7 baffles increased height | 8.7% | n/a |
| Optimization - angled baffles | 3.2% | n/a |
| Optimization - bottom 0.5 m of baffles removed | 2.7% | n/a |
| Final optimization - combination of previous optimizations, new angles | 3.3% | 4.2% |

*Predicted mass distribution for small computational domain.

With the angled baffles installed the flow was observed to be more symmetric at the bottom of the feedwell compared to the baseline geometry. However, relatively high velocity vectors were still observed along baffle #3 at mid-barrel height, implying higher wear on this baffle than other baffles. Examining the participation of baffles in reducing the swirl in the feedwell, it was noted that baffle #1 was not significantly participating while baffle #4 was intercepting a disproportionate fraction of the feed. To address these issues the angle of baffles #2 and #3 was reduced from 45° to 30° from the barrel wall, the size of baffle #1 was doubled and the angle of baffle #4 relative to the feedwell wall was also changed from 90° to 45°.

Although removing the bottom section of all the baffles was shown to improve the flow distribution, this modification could not be implemented for structural reasons. The lower inward baffle extensions (feet) were removed and this change was observed to reduce the presence of recirculation-induced wear zones between the baffles.

Final Baffle Design Results

Figure 8:
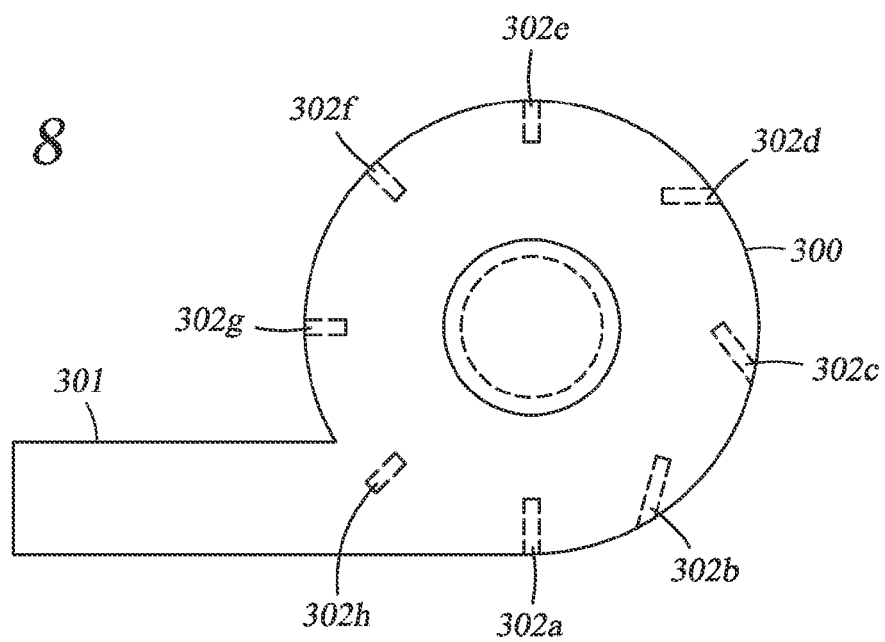
FIG. 8 is schematic of a baffle configuration described herein.

The design shown in FIG. 8 was found to provide the best overall performance over the full range of flow rates. This design demonstrated better circumferential mass flow distribution than the baseline design and the velocities near the bottom of the feedwell were lower and distribution was more uniform. The zones of intense wear were much smaller than predicted in the baseline design, and the strength of the recirculation zones between the baffles, that could lead to increased wear, were also smaller and exhibited lower velocities than in the baseline design.

One noteworthy feedwell design attribute is the circumferential distribution of coarse solids (2 inch to 5 inch rocks). If these coarse solids are consistently ejected from the feedwell in one direction then there is a risk of PSV sidewall wear. In order to evaluate the performance of the final design in this regard, simulations were performed using a discrete particle model. Simulations were run for both 2" rocks and 5" rocks. It must be noted that the CFD grid size limited the accuracy of the large rock simulations, where the 5" rock pattern was less accurately predicted than the 2" rocks. For the high flow rate case the simulations predicted that the rocks should discharge relatively uniformly around ~⅔ of the feedwell deflector circumference, and for the low flow rate case the large rock distribution was predicted to be relatively uniform around the full circumference of the deflector plate. These results indicated a low probability of focused wear zones in the PSV vessel due to repetitive impact of large rocks.

Based on these CFD results, the baffle design shown in FIG. 8 provided that best overall improvement over the baseline design in terms of wear and distribution for both high and low flow rates. The circumferential distribution with this optimized baffle configuration was then experimentally validated.

Physical Laboratory Model Validation of CFD Simulations

To confirm the CFD results, the circumferential feed distribution was measured in the visualization tank using 1:24 scale feedwell models and a Sontek™ Acoustic Doppler Velocimeter (ADV) (Sontek, San Diego, Calif.). The Sontek™ MicroADV uses acoustic Doppler technology to measure 3D flow in a small sampling volume located 5 cm from the end of the probe. A vertical traverse was performed using with this Sontek™ to measure the velocity distribution at up to eight positions around the circumference of the feedwell, located just beyond the diameter of the deflector plate. The peak velocity was measured at each position and the normalized standard deviation was calculated for comparison with the CFD simulations. The normalized standard deviation in circumferential peak velocity was found to be greater than the normalized standard deviation in mass flux predicted by the CFD. This is not surprising given that one is based on eight points in space while the other is based on an integral. The more important comparison is the change in standard deviation in each case between the original and new designs.

Table 3 compares the normalized standard deviations obtained from the CFD simulations and the physical model. The relative performance trends between the baseline design and final optimized baffle geometry appeared to be consistent, with the optimized baffle design providing better circumferential distribution compared to the baseline baffle design.

TABLE 3

Mass distribution results comparing CFD predictions and experimental measurements

| Feedwell Design | Flow Rate | CFD Mass Distribution (σ/mean) | Sontek ™ Peak Velocity Distribution (σ/mean) |
|---|---|---|---|
| Baseline | High | 4.5% | 12.1% |
|  | Low | 7.0% | n/a |
| Final Baffle Optimization | High | 3.3% | 10.3% |
|  | Low | 4.2% | 13.3% |

Summary of Feedwell Internal Geometry Optimization

Based on these results, the recommended design modifications to the baseline feedwell design included the following features:

Seven of the eight internal barrel baffle heights were increased to the full height of the barrel to mitigate the standing wave at intermediate rates and accommodate the higher flow rate and higher barrel fill level.

Baffle #8 reduced in height to avoid (or limit) feed impingement and excessive wear at low feed rates.

The angle of baffles #2, #3, and #4 were adjusted to reduce wear zones in the feedwell and promote a more symmetrical distribution.

The baseline design baffle "feet" at the bottom of the barrel removed to improve the circumferential feed distribution.

Wear-resistant cladding should be applied to both sides of the baffles as high wear was found on both front and back surfaces of most baffles. The outlet pipe at the bottom of the barrel is also a likely high wear zone.

Multiphase recovery performance of this new baffle design was tested in order to ensure that good bitumen recovery performance is maintained. The following was found.

The multiphase separation efficiency of the new feedwell geometry was evaluated using physical modeling to ensure that good bitumen recovery performance was maintained. These tests indicated that no statistical differences in recovery efficiencies were found between the baseline design and the new design of FIG. 8.

Feedwell Discharge Conditioning to Improve Underwash Layer Stability

An underwash layer in a Primary Separation Vessel is layer of warm water that is introduced just below the froth layer located on the free surface. As aerated bitumen rises through the underwash layer, fine minerals are shed from the surface of the droplets, reducing the mineral carry-over. Clean water is constantly added to the underwash layer in order to replace water that is entrained downward into the mineral rich region below. In order to minimize the total water consumption required to maintain this layer it is desirable for the underwash layer to be stably stratified. Design modifications to the feedwell were evaluated in order to improve the underwash stability over a wide range of feed rates up 10,000 tph.

Laboratory experiments revealed that at high process rates the discharge off the end of a conventional deflector plate tended to entrain fluid from the underwash layer above. It was anticipated that the reducing the discharge velocity would reduce entrainment of the underwash layer and improve layer stability.

Prior art described in Mastbergen, D. R.; Kesteren, W. G. M.; Loman, G. J. A., Controlled submerged deposition of fine grained dredged sediment with various diffuser types, WOD-CON XVII, 27 Sep.-1 Oct. 2004, Hamburg, Germany, 2004 speaks to the goals of minimizing radial inlet velocities, re-circulation and turbulence, when depositing fine grain sediment produced in dredging operations. In that application, the objective was to dispose of fine grain sediments within a confined area in a manner that limited turbidity production by generating a circumferential distribution with reduced velocities and minimal external entrainment. Three alternative designs were discussed by Mastbergen; a closed bell type diffuser, a multiple tremy and a Boskalis diffuser. These radial diffusers are designed to prevent internal separation, and to ensure that the discharging layer is at a critical Froude number of 1.0 at the discharge. If the Froude number is larger than 1.0, then the discharging layer was supercritical and higher levels of entrainment would result, and if the Froude number was smaller than 1.0 then the discharging layer would be subcritical and the layer would separated from the lower surface of the upper plane, ambient fluid would ingress to the separation point and limited additional deceleration would occur beyond the separation point. The tendency for decelerating flow to separate is related to the rise in static pressure associated with the decreasing dynamics pressure associated with the decreasing velocity. As with axial diffusers, if the rate of deceleration is too high the adverse pressure gradient become too large and separation occurs. This explains for example why axial diffusers must be limited to divergence angles of approximately seven degrees.

Following the design methodology described by Mastbergen et. al. (2004), a second upper plate should be added above the existing deflector plate with the gap between the two plates decreasing to approximate four inches at the outer perimeter in order to meet the design condition of Fr=1 at 10,000 tph. Unfortunately, this restricted gap between the two plates is much smaller than the fifteen inch minimum gap required in a PSV to permit the passage of large rocks. Increasing the plate spacing to 15" results in an excessively aggressive circumferential flow area increase, leading to flow separation and limited flow deceleration. Some benefit could however be obtained by the virtue of the presence of the upper flow control surface with respect to the end plate discharge characteristics.

An alternative strategy was clearly required to reduce the adverse pressure gradient in order to postpone separation and induce fluid deceleration. A new novel concept was developed to achieve this goal which involved the introduction of ventilation openings through an upper plate, adjacent to central downpipe. It was recognized that the static pressure between the two plates below the inlet would be suppressed due to the adverse pressure gradient, and that this would cause external fluid to be drawn through the vents. The energy required to accelerate the external fluid, draw the external fluid through the vents and mix the external fluid with the discharge flows, is provided by the discharge flow, thereby inducing deceleration of the discharge flow. This configuration is essentially an axisymmetric eductor, with controlled flow through the vents. While entrainment of the ambient fluid still occurs, it is significantly reduced compared with the discharge flow off of a single plate because. The primary and key difference is that the energy is extracted from the inflowing stream (resulting in deceleration) prior to the fluid leaving the end of the deflector plate.

It was anticipated that increasing or decreasing the spacing between parallel plates would influence the effectiveness of the design. In order to gain some insight into the sensitivity to plate spacing data was obtained with both 10" and 15" spacing. It was anticipated that the underwash stability could be further improved by increasing the diameter of the top plate beyond the diameter of the lower plate. This configuration was evaluated for the case of a plate spacing of 22".

Initial development was performed with CFD screening to determine which design provided the best underwash preservation with good circumferential distribution. These results were then validated using a 1:12 scale physical model to evaluate underwash stability and using a 1:20 scale physical model to evaluate circumferential distribution. Finally, the effect of the modified design on bitumen recovery was evaluated in a 1:20 scale model of the PSV vessel. The objective of these experiments was to evaluate the effectiveness of a ventilated top plate with respect to mitigating the impact of the deflector plate discharge on the underwash layer stability over a range of flow rates while preserving good circumferential distribution. Additional constraints were to minimize wear areas of the feedwell, avoid accumulation of rocks, and avoid relatively small holes that could be plugged by the larger solids.

Computational Screening of Alternative Feedwell Designs

Computational simulations were performed to provide a performance comparison between the original single deflector plate and the proposed ventilated dual plate design. The output from CFD provided indirect indication of underwash layer stability through characterization of the velocity field around the feedwell for the various designs. The initial simulations were performed using single phase flow with the fluid density of 1400 kg/m$^3$ selected to match the commercial conditions. The single phase configuration was selected to allow a direct comparison with the physical underwash modeling which was being performed with neutral-density feed.

CFD Results and Discussion

Initial CFD simulation results for the baseline and vented top plate configurations are summarized in Table 4. This table also includes the case of a perfectly distributed central feed at a 50% feed rate, where the maximum interface velocity was found to be 0.36 m/s. This feed rate was selected from experiments of baseline geometry where a stable underwash was maintained. This provided a threshold interface velocity value for layer stability, where geometries that provide velocities below this value were likely to provide layer stability. The vented parallel plate was found to improve distribution for 15" and 10" spacing between plates. Reducing the spacing between the plates from 15" to 10" adversely affected radial interface velocity, while extending the top plate improved the radial interface velocity, however the increased spacing between plates adversely affected the circumferential distribution. A note about Table 4, the model used for these comparisons was more detailed than the model used to generate Tables 2 and 3, and as such, the distribution results are not directly compared between these tables.

TABLE 4

CFD results for distribution and underwash/froth
interface velocity for different configurations.

| Geometry | Maximum Underwash Interface Velocity (m/s) | Mass Distribution (σ/mean) |
|---|---|---|
| Uniform velocity from exit spigot onto deflector (perfect distribution), 50% flow rate. | 0.36 | n/a |
| Aurora baseline | n/a | 15.4% |
| Baffle modifications described above | 0.49 | 5.5% |
| Vented plates - 15" | 0.20 | 14.3% |
| Vented plates - 10" | 0.31 | 7.9% |
| Vented 22"/extended plate | 0.15 | 26.6% |

Following a review of these results the 15" vented parallel plate design was chosen for further development as it appeared to have the best overall characteristics with respect to reducing interface velocity while also providing a good circumferential distribution. Some additional design criteria specific to this design were as follows: the minimum vent size was established at 8" to accommodate large floating debris, and eight structural members of 6" width were included in the design. The design was chosen to be symmetric, and supported in eight places. The venting and supports for this design are shown in FIG. 3.

Laboratory Underwash Performance Testing

The vented top-plate design developed in the CFD study was tested for underwash performance in a 1:12 scale model. A feedwell was designed specifically for testing the variable spacing between plates and different top plate designs. This permitted the rapid testing of various geometries with minimal effort.

Two-Fluid Underwash Simulation

A basic two-fluid cold-flow modeling technique was used to simplify the PSV system by considering only the stability of a simulated underwash layer consisting of fresh water density 1000 kg/m³ atop a simulated middlings layer of salt water with density 1100 kg/m³. The entire middlings region and below in the vessel was modeled with salt water. Fresh water was fed in through the underwash nozzles. The salt water solution was re-circulated from the underflow of the vessel and fed in through the feedwell. The overflow water simply flowed to drain while fresh underwash water was continually supplied.

Each experiment started with a quiescent fresh water layer atop a quiescent salt water filled vessel. After the feed and underwash systems were started, sample density measurements were regularly taken from the underwash layer and the middlings layer.

In an idealized best case performance the underwash layer would remain at a density of 1000 kg/m³, the middlings would remain at 1100 kg/m³, and there would be no mixing between the two. In most practical cases there is some mixing between the two layers caused by the feed stream turbulence. As a result of this mixing between the layers, the underwash layer increases in salt concentration, while the middlings layer density very slowly decreases (the middlings consists of most of the vessel in these experiments so it dilutes relatively slowly compared with the underwash layer).

In the experiments described here the Richardson number of the feedwell based on the middlings to underwash density ratio was matched and the Reynolds numbers were maintained at sufficiently high values to ensure that flow field in the model was turbulent, and therefore comparable to the commercial system.

The underwash flow rates were scaled kinematically to the feed flow rates using underwash nozzles as close to the geometrically scaled size as possible. From these nominal conditions, experiments were conducted at a range of feed Richardson numbers in order to develop performance curves for entrainment across a density interface. More detailed discussion of the experiments is in the sections that follow.

Data Analysis

For each data point measured, the entrainment rate, $Q_e$ was calculated using a well-mixed assumption for the underwash layer. With this assumption, we can describe the flows between the middlings and underwash layer and write the flow balance for the underwash layer as:

$$Q_{UW}\rho_{water} + Q_e\rho_{mids} = Q_{over}\rho_{UW} + Q_e\rho_{UW} \qquad (1)$$

where the Q values are the volumetric flow rates and ρ values are the densities. For the single-phase two-fluid tests $Q_{UW}=Q_{over}$ so re-arranging Equation Error!Reference source not found, to solve for the entrainment rate:

$$Q_e = \frac{Q_{UW}(\rho_{UW} - \rho_{water})}{\rho_{mids} - \rho_{UW}} \qquad (2)$$

An entrainment velocity is calculated by simply dividing the entrainment rate by area A, the total area of the interface between the middlings and the underwash layer $$U_e = \frac{Q_e}{A} \qquad (3)$$

The entrainment velocity discussed in the results has been normalized by the feed inlet velocity scale $U_{feed}$. (i.e $U_e=U_{feed}$). With this normalization the lab results are completely non-dimensionalized and can be scaled up to field scale conditions.

Assuming the nominal conditions of a middlings density of 1100 kg/m³ and an underwash supply of 1000 kg/m³ at the nominal flow rate of 864 m³/hr we can use the entrainment data to determine what density underwash layer will be produced for a given feed system. The better the performance of the system, the closer the underwash will come to the ideal 1000 kg/m³ density. If an underwash layer can be maintained, the aerated bitumen must pass through it on the way to the froth layer and middlings material dragged up with the bitumen should be stripped off and replaced with underwash layer fluid. The less dense the underwash layer, the cleaner the water in the underwash layer and by extension the cleaner the water contained in the froth.

As with the laboratory models, the field underwash layer was modeled as a well-mixed box of unspecified volume; any material that enters the box was assumed to be instantaneously well-mixed. The aerated bitumen that must pass through the underwash layer to get to the overflow was not modeled, it was assumed to pass through the layer and it was assumed that any water that was contained in the froth was the same density as the water in the underwash layer, $\rho_{UW}$. The entrainment rate, $Q_e=U_eA_{PSC}$ where $A_{PSC}$ is the horizontal cross-sectional area of the vessel. The equation describing the flow in and out of the underwash layer in this model is:

$$Q_{UW}\rho_{water} + (Q_e+Q_{up})\rho_{mids} = Q_{over}\rho_{UW} + (Q_eQ_{down})\rho_{UW} \qquad (4)$$

It is assumed that enough water was being supplied by the underwash system to match the water content of the froth overflow. Therefore, no water comes up from the middlings to make up the water content in the froth and $Q_{up}=0$. Any excess water supplied by the underwash system can either go over with the froth (i.e. $Q_{over}=Q_{UW}$) or under with the underflow (i.e. $Q_{down}=Q_{UW}-Q_{over}$) depending on how the vessel was operated. In either case Equation (4) reduces to:

$$Q_{UW}\rho_{water}+Q_e\rho_{mids}=(Q_e+Q_{UW})\rho_{UW} \quad (5)$$

It was assumed that the underwash layer density was between $\rho_{water}=1000$ kg/m$^3$ and $\rho_{mids}=1100$ kg/m$^3$, $Q_e$ was calculated from the experimental data and Equation (5) was solved for $Q_{UW}$, which is the flow rate required to maintain the underwash layer at that density. By calculating $Q_{UW}$ for the entire range of underwash layer densities, we obtain a predicted full scale performance curve for the underwash with a given feed system configuration that does not require one to deal with interpretation of Richardson numbers, entrainment velocities or any other more abstract parameters.

1:12 Scale Model

In the single-phase two-fluid simulation technique the aerated bitumen froth was simulated effectively using a honeycomb material, but its behaviour simulated the presence of the froth layer which is important to the overall fluid layer dynamics of the PSV vessel. The 75 mm thick material with 11 mm diameter honeycomb holes inhibited cross-stream motion and turbulent mixing but allowed low density fresh water to flow up and over the weir. In terms of the underwash layer behavior, this was similar to the effect that the real froth layer should produce.

Underwash Results

Following the identification of the vented top plate concept as the most promising design using CFD, experimental optimization of the vent was conducted. The optimization process is described in this section, where the optimization goal was to balance the circumferential distribution from the feedwell with good underwash performance. From the CFD testing, the baseline vent size was 6.5" (152 mm). In order to add the required structural members the vent size had to be increased to 9" (229 mm) full-scale equivalent to maintain the same open area. From this baseline, further testing determined the largest vent that would support good underwash characteristics.

The underwash performance testing started with the baseline Syncrude Aurora design to provide comparative performance metrics for the other designs. To calibrate the CFD simulations to the experimental results, the 6.5" vent with no structural support was the first vented case tested.

Selected underwash performance curves for promising designs are shown in FIG. 4. The baseline deflector design (Aurora) results indicated that an underwash layer could not be maintained at the nominal underwash flow rate. The radial diffuser was the other extreme end of underwash performance where the results predict that an underwash density of 1010 kg/m$^3$ with this design could be maintained. The 6.5" vented top plate design without structural members and an equivalent area 9" vent with structural members were found to have undesirable underwash performance so their results are not shown in the plot in FIG. 4. Both CFD results and experimental results ranked the baseline Aurora baseline deflector design, a 6.5" vented top plate, and a non-vented parallel top plate design ranked from worst to best respectively in terms of underwash layer stability. This correlation validated the use of CFD to screen the initial design concepts, and demonstrated that the CFD predicted underwash interface velocity is a good measure of underwash performance.

To evaluate the relationship between vent size and underwash performance, the vent area was reduced by 50% by reducing the vent to 3.5" (89 mm). The underwash performance for the 3.5" vent was found to be excellent, however the CFD simulations suggested that this small vent size would likely result in poor circumferential distribution. It was found that the underwash performance of the 7.5" and 8" vents was similar as shown in FIG. 4 with acceptable circumferential distribution predicted by CFD. Finally, the segmented design was also found to have similar performance to the 8" vented top plate design. Based on these results, the 8" vented top plate with structural support was considered to be likely to improve underwash performance, while maintaining good circumferential feed distribution.

CFD Distribution Results for the 8" Vent Size

The vented top plate with 8" (203 mm) vents divided by 6" (152 mm) wide supports and 15" (381 mm) plate spacing was simulated using CFD, and found to have a circumferential distribution variation of 10% (σ/mean). The CFD modeling of a vented design with structural supports indicated that the supports may provide flow-field features that are beneficial to providing a good circumferential distribution. This computational result was validated using physical modeling.

Experimental Validation of Distribution

Following the optimization of the vented feedwell for underwash performance, qualitative and quantitative evaluation of a scale feedwell model was conducted in a visualization tank. Visualization testing was done with a single phase (water) and colored dye. Some of the visualization tests were performed with salt water to simulate the flow of the dense feed out of the feedwell, into the middlings region of the vessel.

A 1:20 scale model of the vented top plate design was built and velocity measurements using Sontek™ were made in the test tank with the results shown in Table 5. These experimental results confirmed that at the high rate the distribution of the vented top plate was comparable to the baseline Syncrude Aurora design, with a difference in σ/mean of only 3.5%. Quantitative circumferential distribution results indicated that circumferential distribution was better at the high rate than for the low rate, however the low-rate visualizations showed that the feed was discharged around the full circumference of the feedwell.

TABLE 5

Velocity Distribution Results

| Feedwell design | Scale | Feed rate | Sontek Velocity $U_{max}$ σ/mean |
|---|---|---|---|
| Aurora baffles baseline | 1:24 | high | 12.1% |
| Modified baffles with Vented Top Plate | 1:20 | High | 15.6% |
| Modified baffles with Vented Top Plate | 1:20 | Low | 56.9% |

Separation Efficiency of Vented Top Plate, Multi-Phase Testing

The last stage in validating the vented parallel plate design was to measure the separation efficiency in the complete 1:20, 360° multiphase model of the PSV.

Multiphase Results

The lights recovery results are shown in Table 6 shows the multiphase separation performance numbers of various flow conditions and deflector plate designs for comparison.

The vented top plate design was found to have higher overflow lights recovery (71.5%) at the high rate than the no top-plate design (65.8%). Less lights material (simulated bitumen) reported to the middlings with the vented top plate, 21.9% compared with 26.2% for the no-top-plate design, alleviating concerns that the design might channel bitumen to the middlings withdrawal. The vented top plate design exhibited increased recovery with decreased feed rate. Middlings withdrawal and overflow recovery are summed together where the recovery ranged from 93.4% to 96.3%, which was also similar to previous results with no top plate. These results showed that the vented top plate may exhibit a minor recovery performance improvement at the high rate. The relatively high standard deviation of circumferential distribution at the low rate that was noted above in the section entitled "Experimental Validation of Distribution" did not appear to adversely affect multiphase recovery efficiencies

TABLE 6

Summary of experimental results of lights recovery and reporting (mean and standard deviation) for the modified designs.

| Feedwell | Rate | Lights Out/Lights In | | | | | |
|---|---|---|---|---|---|---|---|
| | | Overflow | | Middling-Withdrawal | | Underflow | |
| no top plate, baffles | High | 65.8% | 1.2% | 26.2% | 0.6% | 8.0% | 0.8% |
| vented top plate | High | 71.5% | 3.0% | 21.9% | 1.9% | 6.6% | 1.2% |
| vented top plate | Low | 85.1% | 1.1% | 11.2% | 0.9% | 3.7% | 0.7% |

Summary of Underwash Stability Modification

The vented top plate concept was adjusted to incorporate operational criteria for added structural supports. The modified vent design was then optimized for underwash performance. The final vented parallel plate design included 8" radial vents around the feedwell spigot, and 6" wide supports in eight equidistant locations.

The vented top plate design was computationally and experimentally evaluated for circumferential distribution, and found to be comparable to the Aurora baseline results. The experimental results were 15.5% σ/mean for the vented top plate design as compared to 12.1% σ/mean for the baseline Aurora design.

The vented top plate design was evaluated for multiphase recovery efficiency and found to provide as good or better recovery than the single deflector plate design at the high rate.

Additional Embodiments

The protector plate may comprise a top central opening for allowing slurry exiting the extension downpipe to pass.

The at least one ventilation opening may comprise a series of ventilation openings spaced around a periphery of the top central opening of the protector plate.

The deflector plate may comprise a conical portion with its apex pointing toward the feedwell barrel to deflect the slurry radially and outwardly. The conical portion of the deflector plate may comprise side walls at an angle between 10° and 30° from horizontal.

The protector plate may comprise a conical portion, the conical portion of the protector plate being substantially parallel to the conical portion of the deflector plate. The conical portion of the protector plate may comprises side walls at an angle between 10° and 30° from horizontal.

The deflector plate and the protector plate may each further comprise substantially horizontal portions extending from lower ends of their respective conical portions and being substantially parallel with one another.

The top central opening in the protector plate and a bottom opening of the extension downpipe may be approximately aligned vertically and may be at approximately the same height.

The outlet in the bottom of the feedwell barrel may be centrally located.

The extension downpipe may be substantially vertical and substantially perpendicular to the bottom of the feedwell barrel.

The deflector plate and the protector plate may be are spaced from one another by 10 to 22 inches.

The feedwell barrel may be configured to tangentially receive the slurry though the barrel inlet to cause the slurry to swirl around the barrel.

The baffles may increase in radial length in a direction of slurry swirl.

The feedwell barrel may have a circular side wall and the baffles may comprise, beginning with a baffle which is first contacted by the slurry: a first baffle extending within 10° from perpendicular to the side wall, and extending at least as high as the inlet; at least two baffles angled in a direction of slurry swirl by 35° to 70° from perpendicular to the side wall, each extending at least as high as the inlet; at least two baffles extending within 10° from perpendicular to the side wall, each extending at least as high as the inlet; and a final baffle extending within 10° from perpendicular to the side wall, being below the inlet and of a height less than an inlet height.

The feedwell barrel has a circular side wall and wherein the baffles comprise, beginning with a baffle which is first contacted by the slurry: a first baffle extending substantially perpendicular to the side wall; a second baffle angled in a direction of slurry swirl by 55° to 65° from perpendicular to the side wall; a third baffle angled in a direction of slurry swirl by 55° to 65° from perpendicular to the side wall; a fourth baffle angled in a direction of slurry swirl by 40° to 50° from perpendicular to the side wall; a fifth baffle substantially perpendicular to the side wall; a sixth baffle substantially perpendicular to the side wall; a seventh baffle substantially perpendicular to the side wall, each of the first through seventh baffles extending at least as high as the inlet; and an eighth baffle extending substantially perpendicular to the side wall, being below the inlet and of a height less than an inlet height.

The feedwell barrel may have an open top. The separation vessel may be a gravity separation vessel. The separation vessel may be a primary separation vessel for separating a bitumen slurry into a froth system, a middlings stream, and a tailings stream. The slurry may be a bitumen slurry comprising bitumen, water, sand, and air.

The baffles may be within 10° of vertical.

REFERENCES

The following references are mentioned: U.S. Pat. No. 5,147,556 (Taylor); U.S. Pat. No. 6,966,985 (Schoenbrunn, et al.); U.S. Pat. No. 5,015,392 (Taylor); U.S. Pat. No. 2,528,094 (Walker); U.S. Pat. No. 5,944,995 (Sethi, et al.); CA Patent No. 2,630,691 (Egan); CA Patent No. 2,449,443 (Nyman et al.); CA Patent No. 2,449,657 (Nyman et al.); CA Patent No. 2,665,780 (Triglavcanin et al.); CA Patent No. 2,678,307 (Triglavcanin); and U.S. Pat. No. 4,082,671 (Kelly). Mastbergen, D. R.; Kesteren, W. G. M.; Loman, G. J. A., Controlled submerged deposition of fine grained dredged sediment with various diffuser types, WODCON XVII, 27 Sep.-1 Oct. 2004, Hamburg, Germany, 2004.

In the preceding description, for purposes of explanation, numerous details are set forth in order to provide a thorough understanding of the embodiments of the invention. However, it will be apparent to one skilled in the art that these specific details are not required in order to practice the invention.

The above-described embodiments of the invention are intended to be examples only. Alterations, modifications and variations can be effected to the particular embodiments by those of skill in the art without departing from the scope of the invention, which is defined solely by the claims appended hereto.

What is claimed is:

1. A feedwell system for delivering a slurry to a separation vessel, the system comprising:
    a feedwell barrel for containing and controlling the slurry, the feedwell barrel having an inlet for receiving the slurry;
    a series of spaced-apart internal baffles around an inner perimeter of the feedwell barrel for dissipating inflow energy while limiting an internal circulation field within the feedwell barrel;
    the feedwell barrel having a bottom with an outlet in the bottom to allow discharge of the slurry, the outlet being sized to cause a buildup of the slurry within the feedwell barrel, to dissipate energy;
    an extension downpipe depending down from the bottom of the feedwell barrel below the outlet for encouraging axi-symmetric discharge of the slurry out of the extension downpipe;
    a deflector plate below, and spaced from, the extension downpipe to deflect the slurry radially and outwardly; and
    a protector plate above the deflector plate and below the extension downpipe for limiting discharge flow off the deflector plate from disrupting layers formed in the separation vessel, for encouraging circumferential distribution, and for limiting recirculation of the slurry into an area between the extension downpipe and the deflector plate, the protector plate comprising at least one ventilation opening for limiting formation of an adverse pressure gradient and decelerating the flow of the slurry from the feedwell barrel to the an inlet area between the deflector plate and the protector plate by allowing a controlled inflow of an external fluid through the at least one ventilation opening into the inlet area between the deflector plate and the protector plate.

2. The system of claim 1, wherein the protector plate comprises a top central opening for allowing the slurry exiting the extension downpipe to pass.

3. The system of claim 2, wherein the at least one ventilation opening comprises a series of ventilation openings spaced around a periphery of the top central opening of the protector plate.

4. The system of claim 2, wherein the top central opening in the protector plate and a bottom opening of the extension downpipe are approximately aligned vertically and are at approximately the same height.

5. The system of claim 1, wherein the deflector plate comprises a conical portion with its apex pointing toward the feedwell barrel to deflect the slurry radially and outwardly.

6. The system of claim 5, wherein the conical portion of the deflector plate comprises side walls at an angle between 10° and 30° from horizontal.

7. The system of claim 5, wherein the protector plate comprises a conical portion, the conical portion of the protector plate being substantially parallel to the conical portion of the deflector plate.

8. The system of claim 7, wherein the conical portion of the protector plate comprises side walls at an angle between 10° and 30° from horizontal.

9. The system of claim 7, wherein the deflector plate and the protector plate each further comprise substantially horizontal portions extending from lower ends of their respective conical portions and being substantially parallel with one another.

10. The system of claim 1, wherein the outlet in the bottom of the feedwell barrel is centrally located.

11. The system of claim 1, wherein the extension downpipe is substantially vertical and substantially perpendicular to the bottom of the feedwell barrel.

12. The system of claim 1, wherein the deflector plate and the protector plate are spaced from one another by 10 to 22 inches.

13. The system of claim 1, wherein the feedwell barrel is configured to tangentially receive the slurry though the barrel inlet of the feedwell barrel to cause the slurry to swirl around the barrel.

14. The system of claim 13, wherein the series of spaced-apart internal baffles increase in radial length in a direction of slurry swirl.

15. The system of claim 13, wherein the feedwell barrel has a circular side wall and wherein the series of spaced-apart internal baffles comprise, beginning with a baffle which is first contacted by the slurry:
    a first baffle extending within 10° from perpendicular to the circular side wall, and extending at least as high as the inlet of the feedwell barrel;
    at least two baffles angled in a direction of slurry swirl by 35° to 70° from perpendicular to the circular side wall, each extending at least as high as the inlet of the feedwell barrel;
    at least two baffles extending within 10° from perpendicular to the circular side wall, each extending at least as high as the inlet of the feedwell barrel; and
    a final baffle extending within 10° from perpendicular to the circular side wall, being below the inlet of the feedwell barrel and of a height less than an inlet height.

16. The system of claim 13, wherein the feedwell barrel has a circular side wall and wherein the series of spaced-apart internal baffles comprise, beginning with a baffle which is first contacted by the slurry:
    a first baffle extending substantially perpendicular to the circular side wall;
    a second baffle angled in a direction of slurry swirl by 55° to 65° from perpendicular to the circular side wall;
    a third baffle angled in a direction of slurry swirl by 55° to 65° from perpendicular to the circular side wall;
    a fourth baffle angled in a direction of slurry swirl by 40° to 50° from perpendicular to the circular side wall;
    a fifth baffle substantially perpendicular to the circular side wall;
    a sixth baffle substantially perpendicular to the circular side wall;
    a seventh baffle substantially perpendicular to the circular side wall, each of the first through seventh baffles extending at least as high as the inlet of the feedwell barrel; and
    an eighth baffle extending substantially perpendicular to the circular side wall, being below the inlet of the feedwell barrel and of a height less than an inlet height.

17. The system of claim 1, wherein the feedwell barrel has an open top.

18. The system of claim 1, wherein the separation vessel is a primary separation vessel for separating a bitumen slurry into a froth stream, a middlings stream, and a tailings stream.

19. The system of claim 1, wherein the slurry is a bitumen slurry comprising bitumen, water, sand, and air.

20. The system of claim 1, wherein the series of spaced-apart internal baffles are of within 10° of vertical and vertical.

* * * * *